United States Patent [19]

Coyle et al.

[11] 3,900,886

[45] Aug. 19, 1975

[54] SONIC COLOR SYSTEM

[76] Inventors: Jan R. Coyle, 514 E. Ghent Ave.; Robert W. Stevens, 1727 Via Alegre, both of San Dimas, Calif. 91773

[22] Filed: May 23, 1969

[21] Appl. No.: 827,248

[52] U.S. Cl. .................... 358/82
[51] Int. Cl. .................... H04n 9/02
[58] Field of Search .......... 178/5.4, 5.2; 179/1 VS; 240/1, 10; 84/464; 358/81, 82

[56] References Cited

UNITED STATES PATENTS

| | | | |
|---|---|---|---|
| 2,804,500 | 8/1957 | Giacoletto | 178/5.4 |
| 2,875,271 | 2/1959 | Moore et al. | 178/5.2 |
| 2,896,013 | 7/1959 | Parker | 178/5.4 R |
| 3,333,054 | 7/1967 | Melchior et al. | 178/5.4 S |
| 3,551,589 | 12/1970 | Moskovitz | 178/5.4 |

*Primary Examiner*—Robert L. Richardson
*Assistant Examiner*—John C. Martin

[57] ABSTRACT

A sonic color system in which the electron guns of a cathode ray tube adapted to produce color images on the luminescent screen are controlled by a variable sonic input signal, and in which the sonic input signal varies an oscillator which is connected to the antenna terminals for the cathode ray tube circuitry.

8 Claims, 2 Drawing Figures

INVENTORS
Jan R. Coyle
Robert W. Stevens
BY Newton H. Lee, Jr.

INVENTORS
Jan R. Coyle
BY Robert W. Stevens

SONIC COLOR SYSTEM

BACKGROUND OF THE INVENTION

It may be desirable for various purposes to control the electron guns of a cathode ray tube adapted to produce color images in response to a sonic or audio signal.

An example of the foregoing is the attachment of an audio responsive control device to the antenna of the usual color television set, such audio control device being also connectable to the audio output system or speaker leads of a record player, tape player or radio, and the audio control device so affecting the video circuitry of the television set that the electron guns will be caused to produce constantly varying colors of an indefinite pattern on the cathode ray tube screen, in response to variations of the sound produced by the record player or other audio source.

The provision of such means affords a tranquilizing effect and a pleasant atmosphere as the color show related only to the audio signal being played varies with the amplitude or frequency of the sound emitted from the record player. The present invention in this sense is particularly well suited to the amusement and entertainment of individuals or an audience who take pleasure from constantly changing colored lines or images.

Various other functions may be performed by the present invention where a sonic input signal is converted to a color of a particular hue and intensity depending upon the amplitude or the frequency of the input signal, such as the detection of unusual sounds in machinery indicative of potential problems, or the transmission of super sonic intelligence.

SUMMARY OF THE INVENTION

The present invention provides means for controlling the electron guns of a color type cathode ray tube having the usual video and color circuitry, wherein the grids of the electron guns are controlled by a variable oscillator which may be responsive to the sonic or audio output of a sonic or audio generator or record player or other audio source. The oscillator may be a variable chroma oscillator, or the oscillator may be a variable RF oscillator, the output of which is adapted to be mixed with the signal from a fixed frequency color oscillator.

More particularly, the invention contemplates the provision of a simple attachment for the standard color television set, the attachment being connectable to the usual antenna connections for the television set and also being connectable to the audio output circuit of a suitable audio source, such as a record or tape player, radio, or the like, whereby the television channel selector may be adjusted to a non-working television channel, and the audio output of the audio source will be converted to varying colors on the television screen depending upon the audio signal.

An object of the invention is to provide a television set with an attachment to produce a color show having relationship only to the output of an audio source, the attachment being connectable to the television antenna leads and to the audio source and being easy to manufacture and use.

This invention possesses many other advantages, and has other purposes which may be made more clearly apparent from a consideration of forms in which it may be embodied. These forms are shown in the drawings accompanying and forming part of the present specification. They will now be described in detail, for the purpose of illustrating the general principles of the invention; but it is to be understood that such detailed descriptions are not to be taken in a limiting sense, since the scope of the invention is best defined by the appended claims.

DESCRIPTION OF THE PREFERRED EMBODIMENTS

Figure 1:
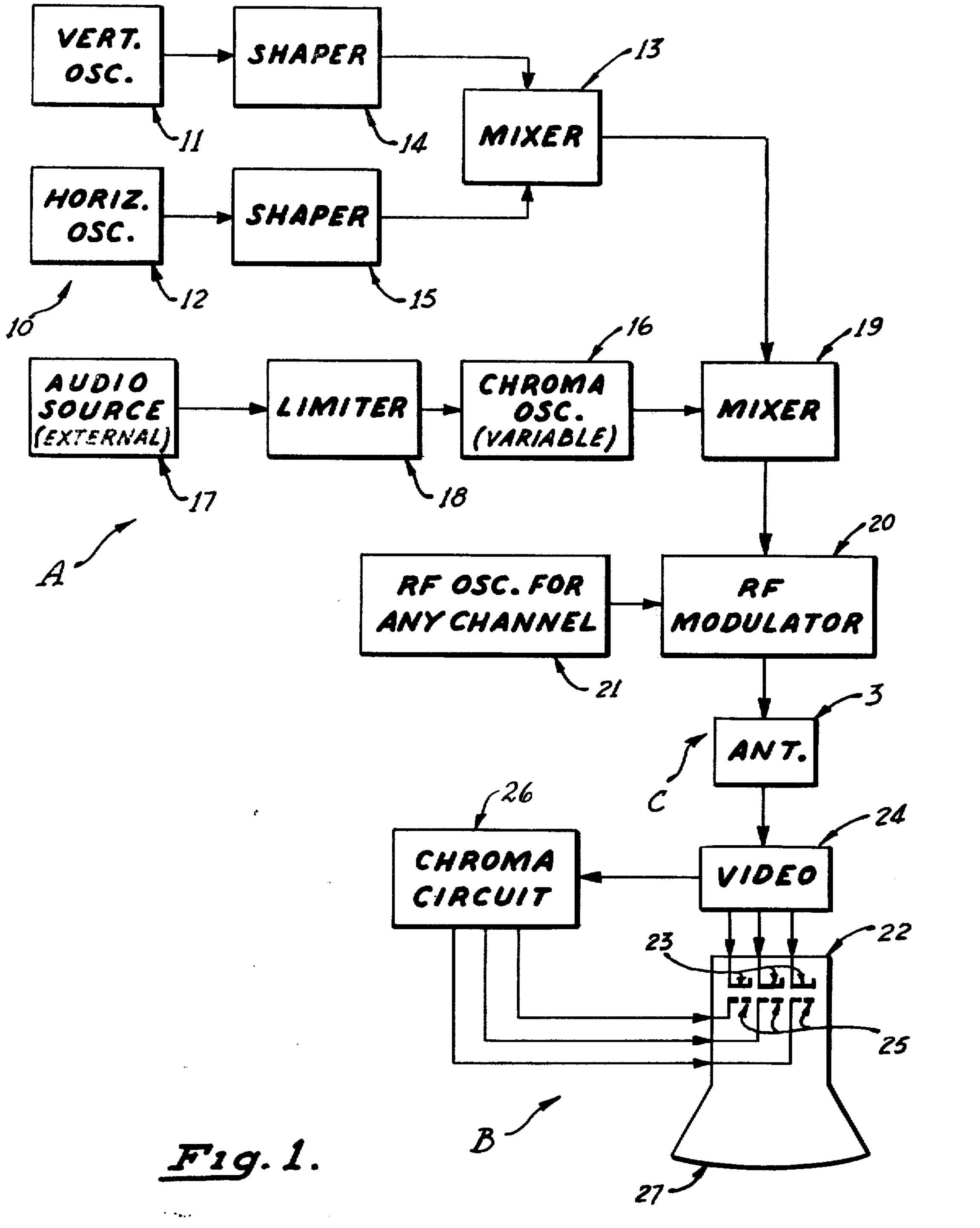
FIG. 1 is a schematic representation of one embodiment of the invention.

Referring first to FIG. 1, the sonic color system, according to this invention, includes a sonic or audio control means A connected to a color producing means B, such as the cathode ray tube of a color television set. The color television set would normally include antenna connections C and the sonic color system A is adapted to be connected into the color television system by the simple expedient of connecting the sonic control system to these antenna connections C.

The sonic control means A includes synchronization control means generally denoted at 10, including a vertical control oscillator 11 and a horizontal control oscillator 12 connected to a mixer 13 which combines the signals from the vertical and horizontal oscillators. There may be interposed between the vertical control oscillator 11 and the mixer 13 a shaper 14 adapted to produce the desired wave form. A similar shaper 15 may be interposed between the horizontal control oscillator 12 and the mixer 13.

The sonic control system A also, in the present embodiment, includes a variable chroma oscillator 16 which is connected in circuit with an audio source 17. As the audio source 17 is of variable amplitude, a limiter 18 may be interposed between the chroma oscillator 16 and the audio source 17 to limit the amplitude from the signals of the audio source to the working range of the chroma oscillator 16.

An example of an audio source 17 would be the audio output of a record or tape player, or a radio, the signals from which are adapted to control the color pattern exhibited by the color producing means B. The chroma oscillator 16 is adapted to provide an output signal of variable amplitude and variable frequency which varies with the amplitude and frequency of the signal derived from the audio or sonic source 17.

The chroma oscillator 16 and the mixer 13 are connected to a mixer 19 where the synchronization control signals and the audio source control signals are mixed.

The output from the video and synchronization mixer 19 is connected to an RF modulator or mixer 20 which is also supplied with a RF carrier signal from a RF oscillator 21 which may be selected for any channel frequency, in the case of a television set, preferably a channel which is not in use by a broadcasting station, whereby to produce a carrier signal which is conducted to the television set by connection of the output from the RF modulator 20 to the antenna connections C.

The color producing means, generally illustrated in FIG. 1, is a usual cathode ray tube 22 having the usual electron guns therein including cathodes 23 connected with the usual video circuitry 24 and grids 25 connected with the usual chroma circuitry 26, the chroma circuitry 26 being connected to and controlled by the video circuitry 24 as is customary.

In the operation of the embodiment described above, the chroma oscillator 16 under the influence of the sonic or audio source 17 is adapted to change the amplitude or frequency of the chroma signal, so that when it is compared to the internal chroma signal of the chroma circuitry 26, a change in the hue of the color produced by the electron guns on the cathode ray tube 22 will be observed. The hue obtained will depend upon the phase relationship of the two chroma signals at a given instant.

Figure 2:
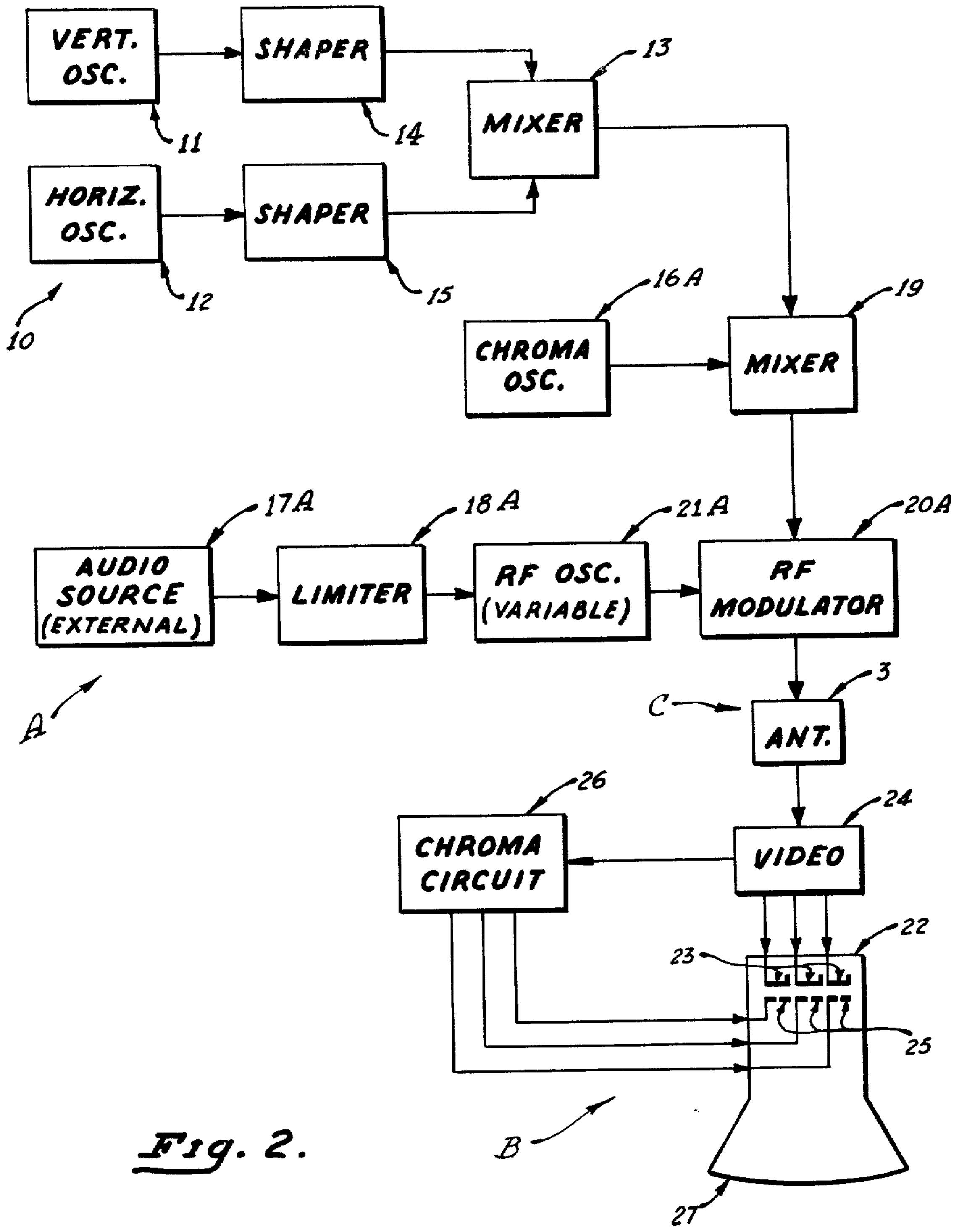
FIG. 2 is a schematic representation of another embodiment of the invention.

Referring to FIG. 2, a modified sonic or audio control system A is shown in combination with the color producing means B. In this embodiment there is illustrated synchronization control means 10 including the vertical synchronization oscillator 11 and the horizontal synchronization oscillator 12, together with shapers 14 and 15 connected to the mixer 13. Here, however, the chroma oscillator 16A is of a fixed frequency so as to obtain a solid color over the entire screen 27 of the cathode ray tube 22. In addition, the sonic or audio source 17A is connected through an amplitude limiter 18A to a variable RF oscillator 21A, the latter in turn being connected to the RF modulator or mixer 20A. The output from the modulator 20A, as in the previously described embodiment, is connected to the antenna terminal means C.

In this embodiment of FIG. 2, the variable RF oscillator will vary in response to changes in the amplitude of the sonic or audio signal to effect changes in the hue of the colors on the full screen as distinguished from the variation caused by the variable chroma oscillator 16 of the first-described embodiment, but in either case changes in the color burst frequency of all of the electron guns will be effected to produce a vertically spaced linear color change on the screen 27.

From the foregoing, it will be apparent that the sonic or audio control means A may be advantageously encapsulated in a small package connectable to the usual antenna connections of a color television set so that a pleasing effect may be produced on the color screen, the colors constantly changing in response to the changes in the audio output of the audio source which, as previously indicated may be a record or tape player or a radio, as examples.

On the other hand, it will be appreciated that the audio source may be any suitable audio source such as a microphone and amplifier whereby various audible signals may be employed to effect a variation in the color image on the screen 27 of the cathode ray tube 22.

In addition, it will be understood that the invention contemplates the application of various super sonic signals to the sonic control means A whereby to effect the desired color pattern changes in the color producing means B.

We claim:

1. In a sonic color system, the combination of color receiver means having a luminescent screen, electron guns for exciting said screen to produce color patterns on said screen, video circuit means and chroma circuit means connected to the cathodes and grids of said electron guns, antenna means for picking up signals and connected to said circuit means to control said electron guns, and sonic signal responsive means connected to said antenna means and including a chroma oscillator and a RF oscillator, one of said oscillators being variable to produce a variable phase signal depending on the sonic signal for controlling said circuit means to produce color patterns on said screen.

2. A system as defined in claim 1, wherein said sonic signal responsive means includes a variable chroma oscillator responsive to variations in amplitude of the sonic signal to variably control said electron guns.

3. A system as defined in claim 1, wherein said sonic signal responsive means include a variable RF oscillator responsive to variations in the frequency and amplitude of the sonic signal to variably control said electron guns.

4. A system as defined in claim 1, including means for limiting the amplitude response of said variable oscillator.

5. A system as defined in claim 1, wherein said sonic signal responsive means comprises synchronization control means, a video mixer in circuit with said synchronization control means and said sonic signal responsive means, said RF oscillator being variable and including a RF mixer in circuit with said video mixer and connected to said antenna means.

6. In a sonic color system, the combination of color pattern producing means having a luminescent screen, electron guns for exciting said screen, said guns having cathodes connected to sonic signal circuit means and grids connected to color circuit means to produce a color pattern on said screen dependent upon an input signal frequency, and sonic signal responsive means being connected to said guns via said sonic and color circuit means to provide a variable input signal and including a color oscillator and a RF oscillator, one of said oscillators being variable, and a sonic signal source connected to the variable oscillator to vary the phase of the input signal frequency.

7. In a sonic color system as defined in claim 6, said color oscillator being variable.

8. In a sonic color system as defined in claim 6, said RF oscillator being variable.

* * * * *

REEXAMINATION CERTIFICATE (435th)

United States Patent [19]

[11] B1 3,900,886

Coyle et al.

[45] Certificate Issued Dec. 17, 1985

[54] SONIC COLOR SYSTEM

[76] Inventors: Jan R. Coyle, 514 E. Ghent Ave.; Robert W. Stevens, 1727 Via Alegre, both of San Dimas, Calif. 91773

Reexamination Request:
No. 90/000,779, May 13, 1985

Reexamination Certificate for:

| | |
|---|---|
| Patent No.: | **3,900,886** |
| Issued: | **Aug. 19, 1975** |
| Appl. No.: | **827,248** |
| Filed: | **May 23, 1969** |

[51] Int. Cl.[4] .............................................. H04N 9/02
[52] U.S. Cl. .................................................... 358/82

[56] References Cited

U.S. PATENT DOCUMENTS 3,188,383 6/1965 Rebeschini .......................... 178/5.4
3,551,589 12/1970 Moskovitz .......................... 178/5.4
3,728,480 4/1985 Baer .................................. 178/6.8

OTHER PUBLICATIONS

Patrick M. Craney, "Test Generators", PF Reporter, Nov. 1963, pp. 32, 33, 100 and 101.
Winston H. Starks, "Rainbow Generator", Radio-Electronics, Jan. 1955, pp. 79–81.
Forest H. Belt, "Color Generators Reach the Solid State", Electronics World, May 1986, pp. 25–29, 64, 65.

*Primary Examiner*—Michael A. Masinick

[57] ABSTRACT

A sonic color system in which the electron guns of a cathode ray tube adapted to produce color images on the luminescent screen are controlled by a variable sonic input signal, and in which the sonic input signal varies an oscillator which is connected to the antenna terminals for the cathode ray tube circuitry.

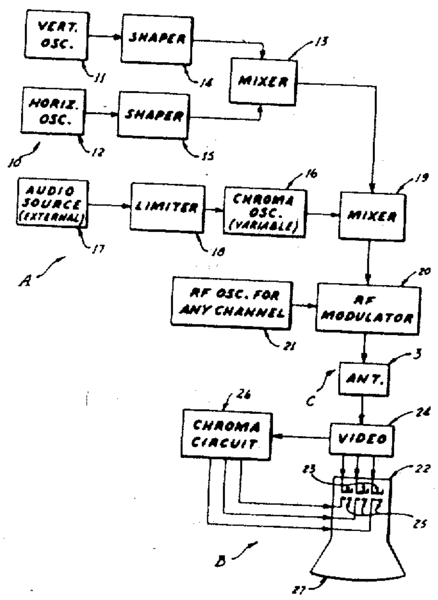

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-8 is confirmed.

* * * * *